United States Patent [19]

Altenschulte

[11] 4,317,152

[45] Feb. 23, 1982

[54] A.C. POWER LINE ASSEMBLY

[75] Inventor: Raymond A. Altenschulte, Indianapolis, Ind.

[73] Assignee: RCA Corporation, New York, N.Y.

[21] Appl. No.: 119,964

[22] Filed: Feb. 8, 1980

[51] Int. Cl.[3] .......... H02H 3/08

[52] U.S. Cl. .......... 361/104; 174/153 G; 339/103 B

[58] Field of Search .......... 361/31, 32, 41, 58, 361/104; 174/65 G, 152 G, 153 G; 333/181-185; 339/103

[56] References Cited

U.S. PATENT DOCUMENTS

| | | | |
|---|---|---|---|
| 2,621,252 | 12/1952 | Pontius | 333/181 |
| 2,662,110 | 12/1953 | Fiori | 174/153 G X |
| 2,938,188 | 5/1960 | Lazzery | 339/59 |
| 3,052,865 | 9/1962 | Pappano et al. | 339/126 |
| 3,147,056 | 9/1964 | Mendelson | 339/36 |
| 3,783,436 | 1/1974 | Bury | 174/153 G X |
| 3,956,672 | 5/1976 | Dumas . | |
| 4,086,643 | 4/1978 | Jacobs | 361/92 |

FOREIGN PATENT DOCUMENTS

| | | |
|---|---|---|
| 516297 | 6/1938 | United Kingdom . |
| 1506732 | 3/1975 | United Kingdom . |
| 2056190 | 6/1980 | United Kingdom . |

*Primary Examiner*—Harry E. Moose, Jr.

*Attorney, Agent, or Firm*—Paul J. Rasmussen; William H. Meagher; W. Brinton Yorks, Jr.

[57] ABSTRACT

An A.C. power line assembly is provided comprising an A.C. line cord with a strain relief bushing molded together with the cord insulation. The bushing provides strain relief for the power cord and contains slots for mounting the assembly in the home instrument. A first locking tab on the bushing secures the assembly in place in the instrument. That part of the bushing which extends into the chassis has an irregular shape and a second locking tab so as to fixedly retain an insulator collar about the cord. The insulator sleeve supports a line choke assembly, which is connected to the line cord. Locking tabs on the insulator sleeve secure a fuse board assembly to the power line assembly, which also acts to hold the line choke assembly in place.

6 Claims, 6 Drawing Figures

A.C. POWER LINE ASSEMBLY

This invention relates to A.C. power line assemblies for electronic home instruments.

The A.C. power line for home instruments, such as radios, record players, and television receivers, have in the past generally been simple, molded insulated cords connected in some manner to the A.C. power section of the instrument. Frequently, some type of strain relief is employed at the connection to the instrument. But as the electronic circuits of these instruments have gotten physically smaller due to integration of components, it has recently become possible to include virtually all of the circuits for an instrument as complex as a television receiver on a single printed circuit board. Many of these circuits are sensitive to problems originating with A.C. supply lines, such as radiated interference and line frequency pick-up by the printed circuits. Accordingly, it is desirable to remove as many A.C. components as possible from the master printed circuit board. In so doing, it is desirable that the one-board concept be retained to as great an extent as possible; that is, a separate printed circuit board for A.C. components is undesirable. Finally, features such as ease of installation of the line cord and standard features such as strain relief provision should be included and retained.

In accordance with the principles of the present invention, an A.C. power line assembly is provided comprising an A.C. line cord with a strain relief and mounting boss molded together with the cord insulation. The boss provides strain relief for the power cord immediately external to a home instrument, and contains slots for mounting the assembly in the home instrument. A first locking tab on the boss secures the assembly in phase in the instrument. That part of the boss which extends into the chassis has an irregular shape and a second locking tab so as to fixedly retain an insulator sleeve about the cord. The insulator sleeve supports an R.F. line choke assembly, which is connected to the line cord. Locking tabs on the insulator sleeve secure a fuse board assembly to the power line assembly, which also acts to hold the line choke assembly in place. A fuse on the fuse board assembly is connected in series with the line cord and choke. A.C. power is supplied from the line choke assembly to the home instrument. If desired, the choke assembly wires which provide power for the instrument may be color-coded to provide an accurate indication of the A.C. line cord plug polarity.

In the drawings:

FIG. 1 illustrates a line cord having a molded body constructed in accordance with the present invention;

FIG. 2*a* and 2*b* are front and plan views of an insulator sleeve adapted to be used with the power line assembly of the present invention;

Figure 1:
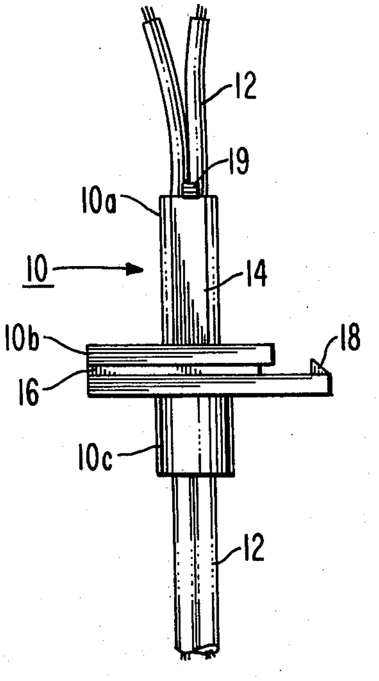

Referring to FIG. 1, an A.C. line cord 12 is shown which includes a molded strain relief bushing 10 constructed in accordance with the principles of the present invention. The end of the A.C. line cord at the bottom of the FIGURE is connected to an A.C. plug (not shown). The strain relief bushing 10 is molded together with the line cord insulation and is made of the same rubber vinyl or similar material as the line cord insulation. The strain relief bushing comprises three major sections 10*a*, 10*b*, and 10*c*. Sections 10*b* and 10*c* together provide strain relief for the A.C. cord when mounted in the instrument. The center of the rectangular section 10*b* is slotted on three sides as shown at 16 which permits the bushing to be slided into a complementary slot of the instrument. The section 10*b* also includes a locking tab 18, which locks into a hole in the instrument to hold the assembly in the slot of the instrument.

Section 10 has an asymmetrically-shaped circumference, which in the embodiment of FIG. 1 is generally D-shaped. A flat side 14 of the otherwise cylindrical section provides the D shape. Section 10*a* has two locking tabs 19 located at the top of the section, one of which is not visible in this FIGURE, as it is located behind the line cord 12.

Figure 2A:
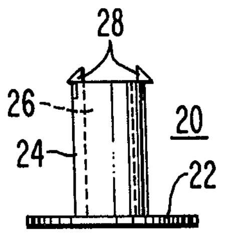
Figure 2B:
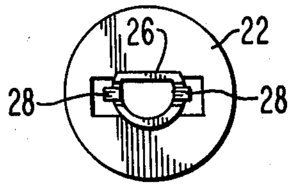

FIGS. 2*a* and 2*b* illustrate an insulator collar 20 by a front view and a top view, respectively. The insulator collar includes a disc-shaped base 22 and a hollow D-shaped section 24. The flat face 26 provides a D shape for the otherwise cylindrical section 24. Two locking tabs 28 are located at the top of section 24. The hollow center of the collar is dimensioned so that the collar will snugly fit over section 10*a* of the strain relief bushing 10, with section 22 resting against the upper surface of section 10*b*. Sections 10*a* and 24 of the bushing and the collar are of the same length, so that locking tabs 19 will snap over the top of the installed collar to hold it in place on the bushing.

Figure 3:
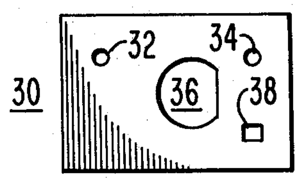
FIG. 3 illustrates a fuse assembly board.

FIG. 3 illustrates a fuse board 30 having a center hole 36 dimensioned to slide over the D-shaped section of the collar 20. The fuse board contains holes 32 and 34 for mounting a fuse holder, and a hole 38 for engaging a solder terminal.

Figure 5:
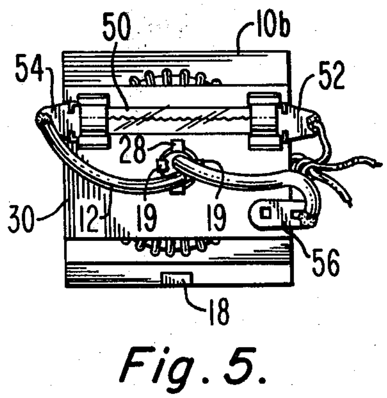
FIG. 5 is a top view of the assembly of FIG. 4.
Figure 4:
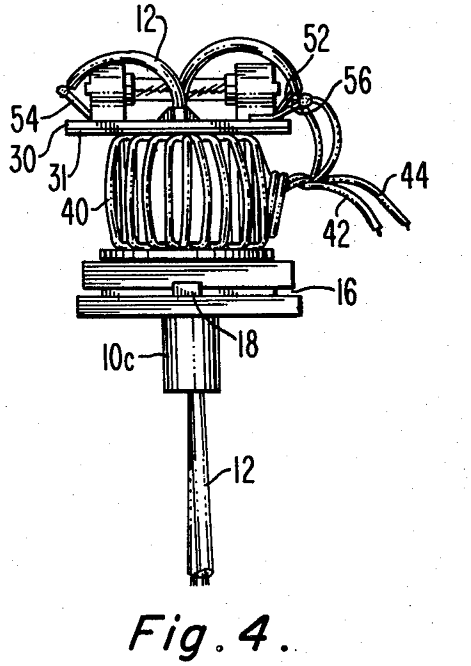
FIG. 4 is a forward view of a complete A.C. power line assembly constructed in accordance with the principles of the present invention.

The components of FIGS. 1–3 are shown assembled in FIG. 4 to form an A.C. power line assembly. The assembly also includes an A.C. line choke 40, comprising a doughnut-shaped metallic core wound with two insulated wires 42 and 44. The assembly further includes a cardboard insulator 31, which has outer dimensions matching those of fuse board 30, and a D-shaped center hole matching that of fuse board hole 36. A fuse holder comprising end pieces 52 and 54 is mounted on the fuse board 30. One A.C. line cord is connected to one end 54 of the fuse holder. The other end of the fuse holder is connected to an end of choke wire 42. The remaining A.C. line cord is connected to a solder terminal 56 on the fuse board, as is an end of choke wire 44. The remaining ends of wires 42 and 44 may be connected to a diode bridge in the instrument (not shown) to convert the A.C. line power to a D.C. voltage. FIG. 5 shows a top view of the assembly of FIG. 4, which better illustrates the positioning of the fuse holder 52, 54, and the solder terminal 56. A fuse 50 is shown connected in the fuse holder. Locking tabs 19 are also clearly visible in this FIGURE, which retain the insulator collar 20 in place. Locking tabs 28 of the collar are also shown, which hold the fuse board in place on top of the insulator 31 and the line choke 40.

In the complete power line assembly of FIGS. 4 and 5, it may be seen that the insulator 31 serves to insulate the fuse holder and solder terminal 56 from the line choke, as these components are mounted through holes 32, 34 and 38 of the fuse board 30. The insulator collar 20 provides rigid support for the line choke 40 and the fuse board 30, and also provides electrical insulation between the line choke 40 and the strain relief bushing 10. The insulator collar also holds the fuse board 30 firmly in place. The complete power line assembly provides mountings for the fuse holder and line choke and their interconnections which are apart from the circuit boards of a home instrument. Thus, only the rectifier diodes of the typical home instrument A.C. section need be mounted in the instrument itself.

The power line assembly may be constructed separately from any home instrument. The assembly can be one of the final items installed in the instrument, which is done by sliding section 10*b* into the instrument and connecting wires 42 and 44. These wires may be conveniently color-coded to provide a clear indication of the polarity of the line plug. This facilitates connection of the assembly to the instrument with correct A.C. polarity in the instrument.

What is claimed is:

1. An A.C. power line assembly for a home instrument comprising:

a fuse board assembly;

an A.C. line choke including first and second wires;

an insulator collar suitable for engaging said fuse board assembly and said line choke, and including means for retaining said fuse board and line choke in position; and an insulated line cord including a molded strain relief bushing adapted for mounting in said instrument, said bushing including means for locking said assembly in place in said instrument when installed, and means for engaging said insulator collar, wherein said line cord, said fuse board, and said line choke are coupled to provide fuse protected and filtered A.C. power at the ends of said first and second wires.

2. The A.C. power line assembly of claim 1 wherein said insulated line cord including said molded strain relief bushing comprises:

means for engaging said assembly in a slot in said instrument;

means for locking said bushing in place in said instrument; and means for engaging and retaining said insulator collar;

wherein said first, second and third named means are constructed as a single molded piece together with the insulation of said line cord.

3. An A.C. power line assembly for a home instrument comprising:

a fuse board assembly, including a fuse holder;

an A.C. line choke including first and second wires wrapped around a core;

an insulator collar for supporting said fuse board assembly and said line choke, and including means for retaining said fuse board assembly and line choke on said collar;

an insulated line cord including a molded strain relief bushing adapted for mounting in said instrument, said bushing including means for locking said assembly in said instrument and means for receiving said insulator collar; and means for electrically interconnecting said line cord, said fuse holder, and said line choke to provide fuse protected and filtered A.C. power at the ends of said first and second wires.

4. The A.C. power line assembly of claim 3, wherein said line cord extends longitudinally substantially through the center of said strain relief bushing, said insulated collar includes a hollow, substantially tubular portion mounted on said receiving means with said line cord extending therethrough, said A.C. line choke core is substantially doughnut-shaped and is mounted about said tubular portion of said collar, and said fuse board assembly includes an aperture suitable for engaging said tubular portion of said collar.

5. The A.C. power line assembly of claim 4, wherein said line cord includes first and second stranded wires, said fuse holder includes first and second solder tabs and said fuse board assembly includes a third solder tab, and said interconnecting means connects said first stranded wire to said first solder tab, said second stranded wire and said first A.C. line choke wire to said third solder tab, and said second A.C. line choke wire to said second solder tab.

6. The A.C. power line assembly of claim 3, wherein said insulated line cord including said strain relief bushing comprises:

an insulated A.C. line cord; and a molded mounting and strain relief bushing disposed about said A.C. line cord, said bushing including means for engaging said assembly in an opening in said instrument, means for locking said assembly in place when engaged and means for receiving and retaining said insulator collar on said bushing.

* * * * *